(12) United States Patent
Uwano (10) Patent No.: US 10,928,999 B2
(45) Date of Patent: Feb. 23, 2021

(54) ABNORMALITY DETECTION PARAMETER ADJUSTMENT DISPLAY DEVICE

(71) Applicant: FANUC CORPORATION, Yamanashi (JP)

(72) Inventor: Tomofumi Uwano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/234,578

(22) Filed: Dec. 28, 2018

(65) Prior Publication Data

US 2019/0220178 A1 Jul. 18, 2019

(30) Foreign Application Priority Data

Jan. 18, 2018 (JP) ................ 2018-006303

(51) Int. Cl.
*G06F 3/0484* (2013.01)
*G06T 11/20* (2006.01)

(52) U.S. Cl.
CPC ........ *G06F 3/04847* (2013.01); *G06T 11/203* (2013.01); *G06T 11/206* (2013.01)

(58) Field of Classification Search
CPC ... G06F 3/04847; G06T 11/203; G06T 11/206
See application file for complete search history.

(56) References Cited

U.S. PATENT DOCUMENTS

| 10,167,798 B1* | 1/2019 | Van Camp | F02D 41/10 |
| 2005/0197805 A1* | 9/2005 | Eryurek | G05B 23/0272 |
| | | | 702/188 |
| 2008/0168376 A1* | 7/2008 | Tien | G06Q 10/04 |
| | | | 715/772 |
| 2012/0272186 A1* | 10/2012 | Kraut | G06F 3/0482 |
| | | | 715/810 |
| 2012/0290879 A1 | 11/2012 | Shibuya et al. | |
| 2017/0307480 A1* | 10/2017 | Uchida | G06F 3/14 |
| 2018/0013376 A1* | 1/2018 | Sekiguchi | H02P 29/50 |
| 2019/0012553 A1* | 1/2019 | Maruchi | G06F 11/079 |

FOREIGN PATENT DOCUMENTS

| JP | 2007310665 A | 11/2007 |
| JP | 2011-70635 A | 4/2011 |
| JP | 2012138044 A | 7/2012 |
| JP | 2016164772 A | 9/2016 |

OTHER PUBLICATIONS

"Introduction to Anomaly Detection", 2017, available at https://web.archive.org/web/20170404131512/https://www.kdnuggets.com/2017/04/datascience-introduction-anomaly-detection.html, captured Apr. 4, 2017, hereinafter "KDNuggets".*
Leif E. Peterson, "K-nearest neighbor", 2009, available at https://web.archive.org/web/20170403213111/http://www.scholarpedia.org/article/K-nearest_neighbor.*

* cited by examiner

*Primary Examiner* — Matthew Ell
(74) *Attorney, Agent, or Firm* — Hauptman Ham, LLP (57) ABSTRACT

An abnormality detection parameter adjustment display device adjusts a parameter for determination for detecting operation abnormality of a mechanical facility based on an input from a user, collects operation information on the mechanical facility, creates a dataset based on the operation information, determines whether or not the dataset indicates a normal operating state, based on the parameter, displays the dataset in a graph, and makes an adjustment for display in such a position that the relationship between the data of the graph and the parameter is visually ascertainable.

11 Claims, 6 Drawing Sheets

FIG.6

ABNORMALITY DETECTION PARAMETER ADJUSTMENT DISPLAY DEVICE

RELATED APPLICATIONS

The present application claims priority of Japanese Application Number 2018-006303, filed on Jan. 18, 2018, the disclosure of which is hereby incorporated by reference herein in its entirety.

BACKGROUND OF THE INVENTION

Field of the Invention

The present invention relates to an abnormality detection parameter adjustment display device.

Description of the Related Art

Mechanical facilities, such as robots and machine tools, which operate in a factory are connected to a network for management. Devices connected to the network laid in the factory include, for example, a device that monitors the operating state of the entire factory, based on information on the mechanical facilities including the operating situations of the mechanical facilities connected to the network, a device that fixes operating schedules of the mechanical facilities based on production planning and personnel and facility information, and the like.

Operation management software used to manage the operating situations of the mechanical facilities enables a user to set an arbitrary threshold for acquired signal data, thereby detecting failures caused in the mechanical facilities and issuing warnings. However, the failures caused in the mechanical facilities include a large number of abnormal patterns that cannot be detected with a simple threshold.

Thereupon, the k-nearest neighbor algorithm can be assumed to be introduced as a method that can be used to diagnose whether newly acquired data are normal or abnormal. The k-nearest neighbor algorithm is a method for determining whether a certain data point is close or distant as compared with other data points and can detect a data change or the like that cannot be detected with only a simple threshold (e.g., Japanese Patent Application Laid-Open No. 2011-070635).

Figure 6:
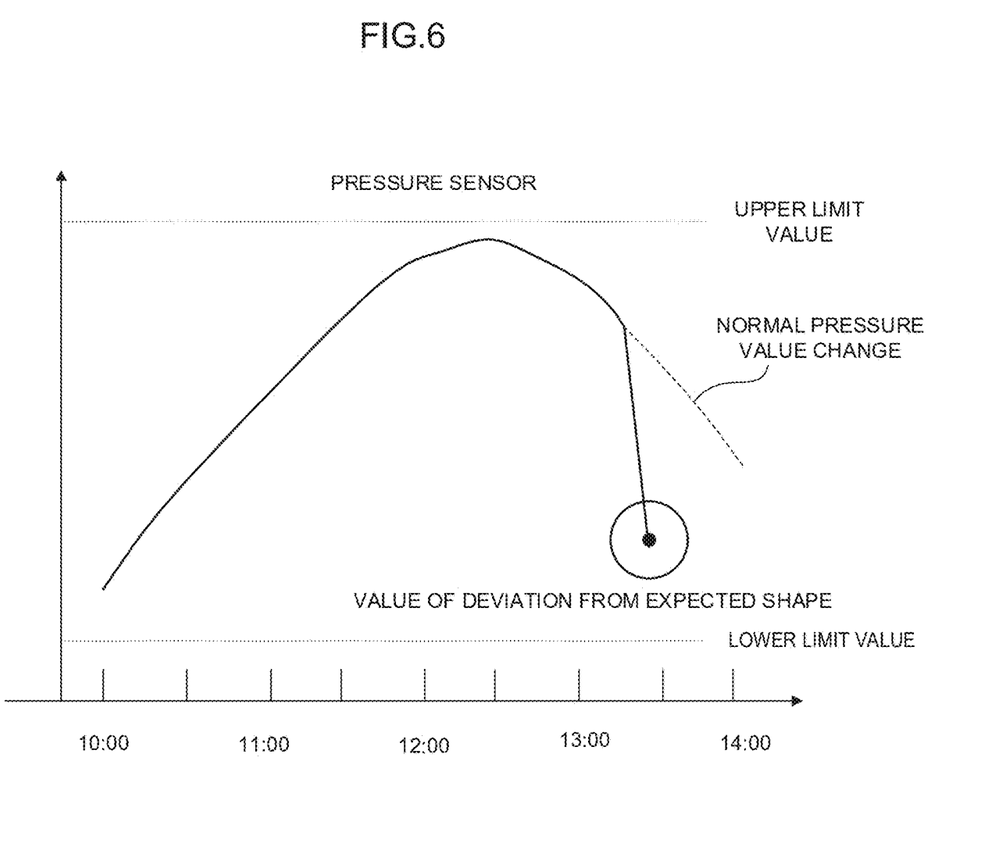
FIG. 6 is a diagram showing a prior art example of data abnormality determination.

As illustrated in FIG. 6, for example, a malfunction or operation abnormality of a mechanical facility is assumed to be detected based on time-series data with which pressure data detected by a pressure sensor are acquired at predetermined sampling intervals.

If the operation of the mechanical facility is determined to be abnormal when the value of pressure detected by the pressure sensor is deviated from a predetermined range, the upper and lower limit thresholds of the pressure value are fixed, as shown in FIG. 6. Thus, the operation of the mechanical facility can be determined to be abnormal if a pressure value higher than the upper limit threshold or lower than the lower limit threshold is detected. However, this malfunction detection method using the thresholds cannot detect a deviation from a normal change in pressure as a malfunction or operation abnormality when the pressure detected by the pressure sensor falls within the range between the upper and lower limit thresholds.

In such a case, the k-nearest neighbor algorithm can be used to determine the malfunction on the basis of the distance from the data point indicative of normal change in pressure value. Thus, the time-series data abnormality detection method based on the k-nearest neighbor algorithm is characterized by being more intuitive and easily understandable by the user than any other time-series data abnormality detection method.

In the case where the abnormality is detected based on the time-series data by the k-nearest neighbor algorithm, the user can individually fix a data window width w, abnormality threshold ϵ, and number k of data for abnormality calculation and thereby adjust the accuracy of abnormality detection. However, it is not very easy to reflect user's feeling on whether or not to detect abnormality in case of deviation from expected values of the time-series data, on the setting of these parameters. Therefore, it is necessary to repeat such work as repeatedly monitoring the time-series data based on the fixed parameters, adjusting the parameters if a determination incompatible with the user's feeling is made (if a value considered by the user to be an abnormal value cannot be detected as abnormal or if a value considered by the user to be a normal value is wrongly detected as abnormal), and monitoring the time-series data again. This is troublesome to the user.

SUMMARY OF THE INVENTION

The object of the present invention is to provide an abnormality detection parameter adjustment display device capable of easily fixing a parameter used for abnormality detection.

An abnormality detection parameter adjustment display device of the present invention solves the above problem by a structure that enables a user to make an adjustment of parameters while identifying normal and abnormal data on a screen, after displaying samples designated by the user as the normal and abnormal data on the screen, among signal data collected by an operation management device or the like.

An abnormality detection parameter adjustment display device according to the present invention is configured to visually support a user's adjustment of a parameter for determination for detecting operation abnormality of a mechanical facility based on operation information on the mechanical facility. The abnormality detection parameter adjustment display device include: a parameter adjustment unit configured to adjust the parameter based on the user's input; a data collection unit configured to collect the operation information on the mechanical facility; a dataset creation unit configured to create at least one dataset based on the operation information; a determination unit configured to determine, based on the parameter, whether the dataset indicates a normal operating state or an abnormal operating state; and a display unit configured to create display data in which the dataset is displayed in a graph. The parameter adjustment unit comprises an adjustment unit displayed in such a position that the relationship between the data of the graph and the parameter is visually ascertainable.

According to the present invention, even a user who has little mathematical knowledge is enabled to adjust parameters used for normality determination of time-series data by an intuitive operation, in detecting abnormality of signal data that cannot be detected with only a simple threshold.

DETAILED DESCRIPTION OF THE PREFERRED EMBODIMENTS

Figure 1:
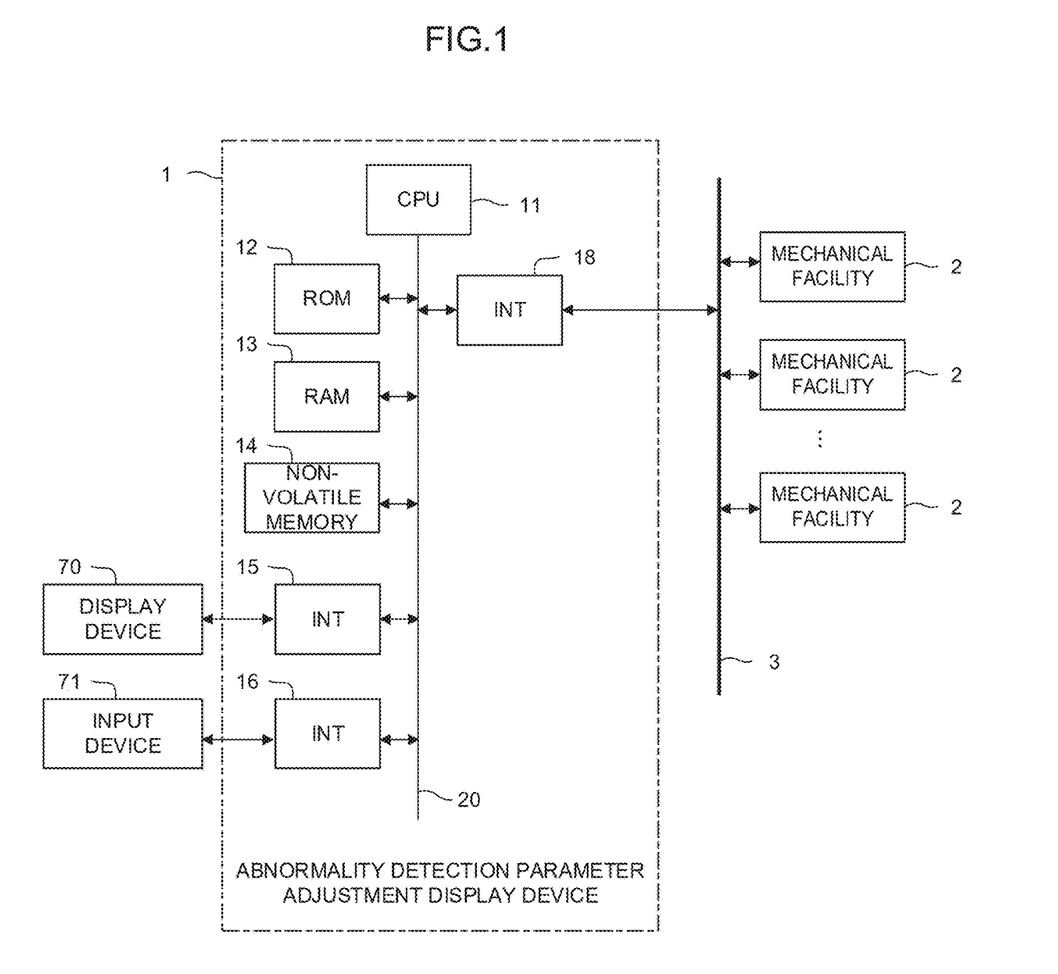
FIG. 1 is a schematic hardware configuration diagram of an abnormality detection parameter adjustment display device according to one embodiment.

FIG. 1 is a schematic hardware configuration diagram showing the principal part of an abnormality detection parameter adjustment display device according to one embodiment of the present invention.

An abnormality detection parameter adjustment display device 1 can be implemented as a computer, such as a cell controller, host computer, or cloud server, connected to a controller for controlling mechanical facilities through a network. Also, the abnormality detection parameter adjustment display device 1 can be implemented, for example, as the controller itself for controlling the mechanical facilities or a personal computer or the like located together with the controller.

FIG. 1 shows an example showing a case where the abnormality detection parameter adjustment display device 1 is implemented as the computer connected to the controller for controlling the mechanical facilities through the network.

A CPU 11 of the abnormality detection parameter adjustment display device 1 according to the present embodiment is a processor for generally controlling the abnormality detection parameter adjustment display device 1. The CPU 11 reads out system programs stored in a ROM 12 through a bus 20 and controls the entire abnormality detection parameter adjustment display device 1 according to the system programs. A RAM 13 is temporarily loaded with temporary calculation data and display data, various data input through an input unit (not shown) by an operator, and the like.

A non-volatile memory 14 is constructed, for example, as a memory that is backed up by a battery (not shown) so that its storage state can be retained even when the abnormality detection parameter adjustment display device 1 is powered off. The non-volatile memory 14 is stored with programs or data read from an external storage device (not shown), data input from an input device 71, such as a keyboard or mouse, and input through an interface 16, various data acquired from mechanical facilities 2 through a network 3 (and through an interface 18), and the like. The programs stored in the non-volatile memory 14 may be developed in the RAM 13 during use. Moreover, various system programs required for the operation of the abnormality detection parameter adjustment display device 1 are previously written in the ROM 12. Furthermore, the abnormality detection parameter adjustment display device 1 displays information to be provided to a user on the display device 70 through an interface 15.

The abnormality detection parameter adjustment display device 1 sets various parameters for the mechanical facilities 2 through the interface 18. Also, the abnormality detection parameter adjustment display device 1 acquires various data required for the management of the mechanical facilities 2 from their various parts through the interface 18.

Figure 2:
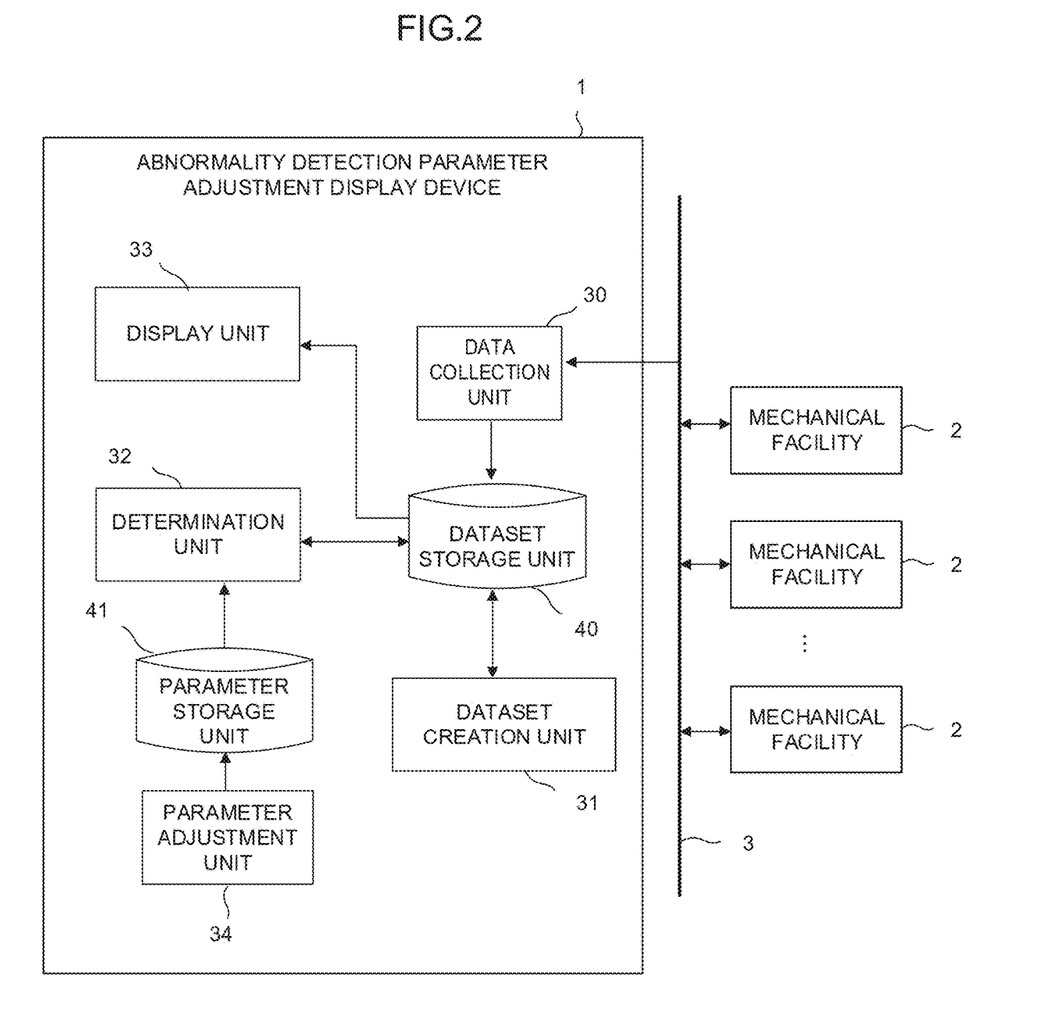
FIG. 2 is a functional block diagram of the abnormality detection parameter adjustment display device according to the one embodiment.

FIG. 2 is a schematic functional block diagram of the abnormality detection parameter adjustment display device 1 according to the one embodiment of the present invention.

The individual functional blocks shown in FIG. 2 are implemented as the CPU 11 of the abnormality detection parameter adjustment display device 1 shown in FIG. 1 executes the system programs and controls the various parts of the abnormality detection parameter adjustment display device 1.

The abnormality detection parameter adjustment display device 1 of the present embodiment comprises a data collection unit 30, dataset creation unit 31, determination unit 32, display unit 33, and parameter adjustment unit 34. Moreover, a dataset storage unit 40 and a parameter storage unit 41 are secured on the non-volatile memory 14. The dataset storage unit 40 stores datasets in a graph displayed on the display device 70. The parameter storage unit 41 stores parameters used to detect the abnormality of data.

The data collection unit 30 collects operation information on the mechanical facilities 2 to be managed. If the abnormality detection parameter adjustment display device 1 is connected to the mechanical facilities 2 through the network 3, as shown in FIG. 2, the data collection unit 30 collects the operation information from the individual mechanical facilities 2 through the network 3. Moreover, if the abnormality detection parameter adjustment display device 1 is mounted on the controller, the data collection unit 30 collects the operation information on the mechanical facilities 2 from various parts of the controller. The data collection unit 30 may be configured, for example, to collect the operation information on the mechanical facilities 2 stored in a storage device (not shown). The operation information collected by the data collection unit 30 may include, for example, the coordinate position and moving speed of drive units of the mechanical facilities 2, acceleration, or physical quantities such as the current and voltage values of a motor for driving the drive unit. Alternatively, the operation information may include physical quantities such as the temperature, humidity, pressure, coordinate position, and luminous intensity detected by sensors attached to the mechanical facilities 2, or values obtained based on these physical quantities. The data collection unit 30 acquires these data as time-series data sampled at predetermined sampling intervals and stores the acquired data into the dataset storage unit 40.

Figure 3:
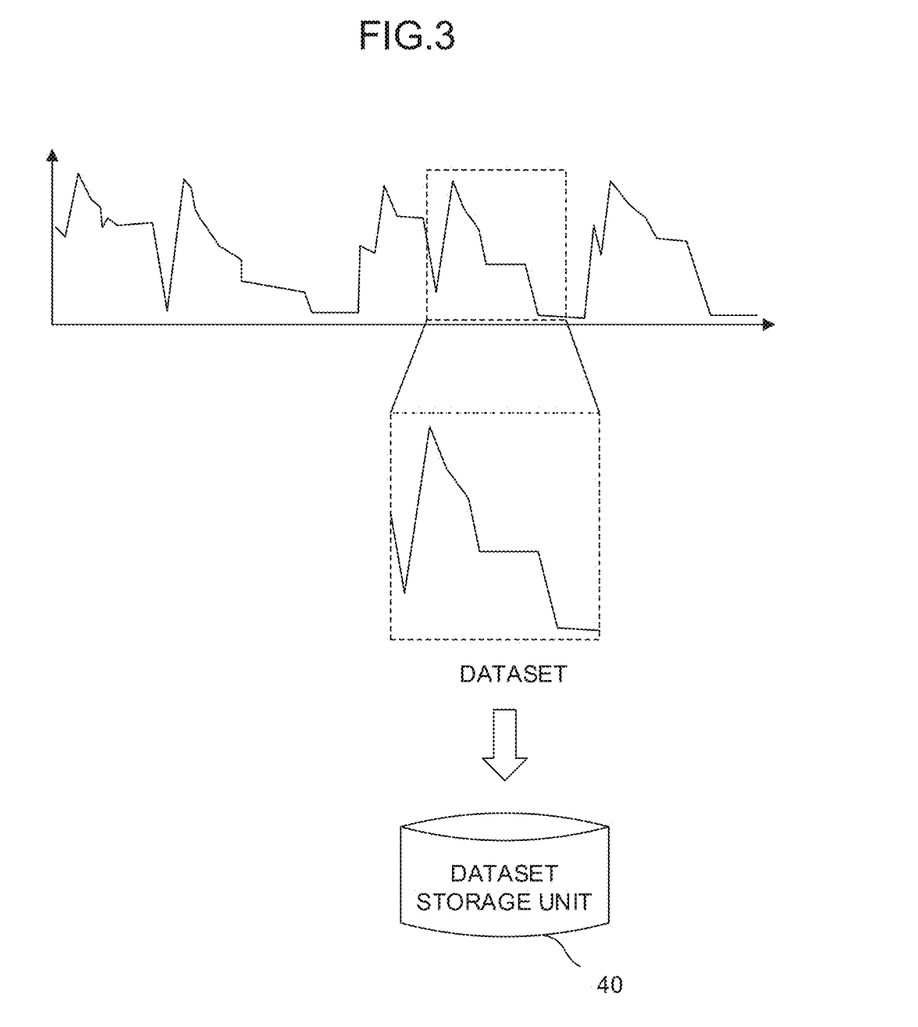
FIG. 3 is a diagram showing an example of a dataset.

The dataset creation unit 31 creates datasets to be displayed on the display device 70 from the time-series data collected by the data collection unit 30. The dataset creation unit 31 may be configured to create data within a range specified from time-series collected by the data collection unit 30 as one dataset, as illustrated in FIG. 3, for example. In this case, numerical designation of the data range may be performed based on numerical designation of the data range by the user through the input device 71. Alternatively, as shown in FIG. 3, the numerical designation may be performed by the user who specifies start and end points by means of the input device 71 (e.g., pointing device) after graphically displaying the time-series data on the display device 70.

The datasets created by the dataset creation unit 31 are further tagged to indicate whether they are normal or abnormal from the user's viewpoint. The dataset creation unit 31 may tag the datasets based on the user's designation. Moreover, the dataset creation unit 31 may induce the user to create the datasets from the time-series data, on the premise of creating, for example, abnormal datasets, thereby automatically performing tagging to indicate that the created datasets are abnormal. Either method may be used provided that tags (normality tags) specified by the user can be applied to the datasets selectively created by the user.

The dataset creation unit 31 may be configured to further accept the designation of data portions (e.g., data points) to be determined by the user and store the accepted data portions to be determined, in association with the datasets, into the dataset storage unit 40, in tagging the created datasets for the indication of normality (normal or abnormal).

In performing the normality determination exemplified by the k-nearest neighbor algorithm, for example, it can be determined whether a certain data point included in the dataset is normal or abnormal as viewed from another data point. In such a case, the dataset creation unit 31 accepts from the user those points in the datasets for which the normality tags are applied, in performing tagging for normality. If the normality determination is performed for the entire datasets (e.g., for data transition patterns), such designation of the data portions to be determined is unnecessary.

The determination unit 32 determines the individual datasets (and data portions to be determined) stored in the dataset storage unit 40 based on the current parameters stored in the parameter storage unit 41 and stores the resulting normality determination of the datasets, in association with the individual datasets, into the dataset storage unit 40. As an example of the determination by the determination unit 32, the k-nearest neighbor algorithm is used, and in this case, the parameter storage unit 41 is stored with a data window width w, abnormality threshold $\epsilon$, and number k of data for abnormality calculation, as parameters used for the determination of the k-nearest neighbor algorithm.

Based on the data window width w, abnormality threshold $\epsilon$, and data number k for abnormality calculation stored in the parameter storage unit 41, the determination unit 32 determines whether the data portions to be determined are normal or abnormal with respect to the individual datasets stored in the dataset storage unit 40, and stores the data portions in association with the datasets into the dataset storage unit 40 as a result of the determination of the datasets.

Figure 4:
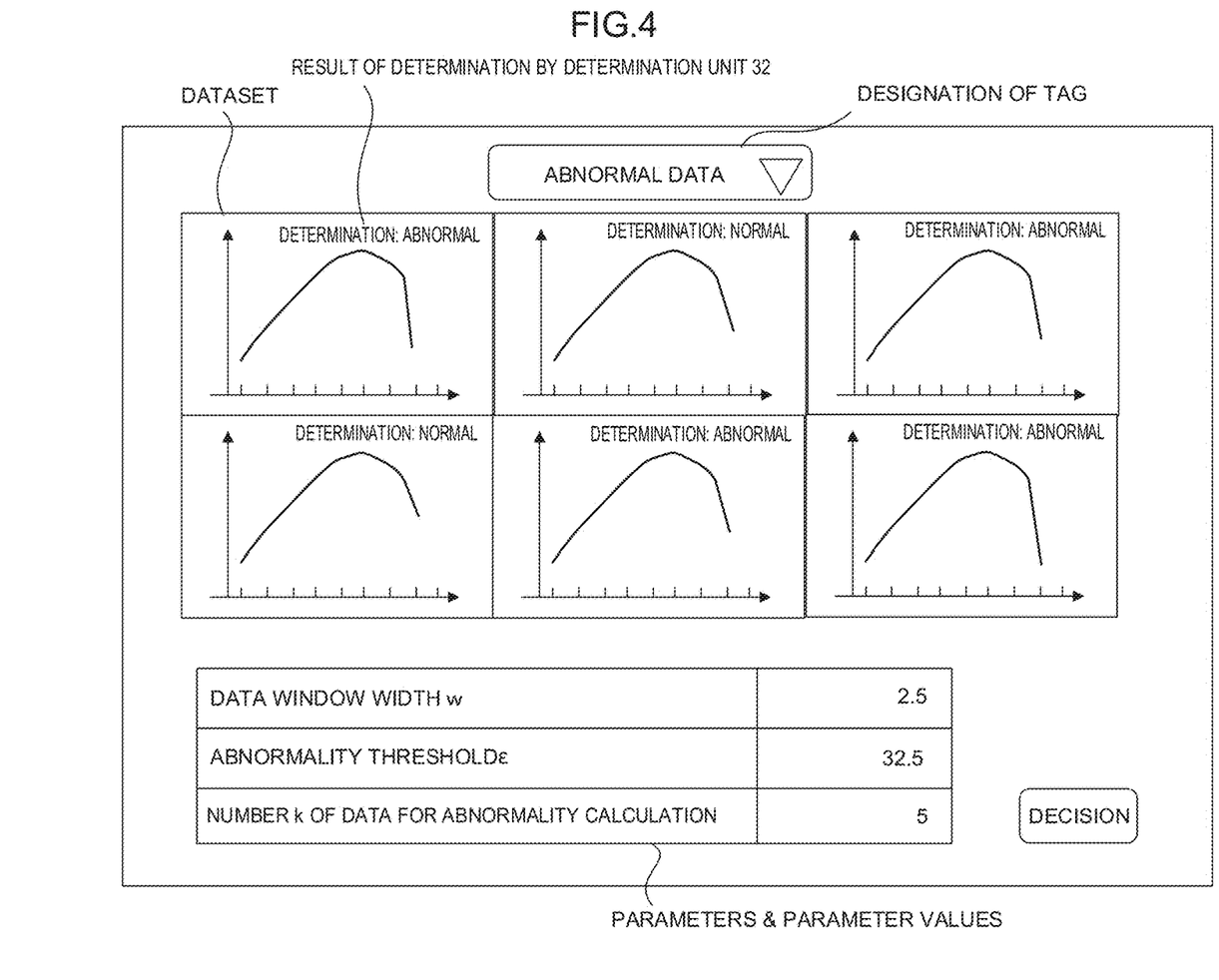
FIG. 4 is a diagram showing an example of a display screen of a display unit.

The display unit 33 displays the individual datasets stored in the dataset storage unit 40 on the display device 70. FIG. 4 is an example of display of the datasets in the dataset storage unit 40 by the display unit 33.

As shown in FIG. 4, the display unit 33 displays the datasets determined by the determination unit 32 so that the result of normality determination of the datasets can be ascertained. The display unit 33 may be configured to display only those datasets to which specified tags are applied on the display device 70, as shown in FIG. 4, or display all the datasets after the tags applied to the datasets are enabled to be ascertained. The display unit 33 may be configured to display the datasets by a conventional display method such as scrolling or page switching when the datasets to be displayed are large in number. The display unit 33 may be configured to display the datasets on the display device 70 so that the parameters currently stored in the parameter storage unit 41 can be ascertained together with the datasets.

Figure 5:
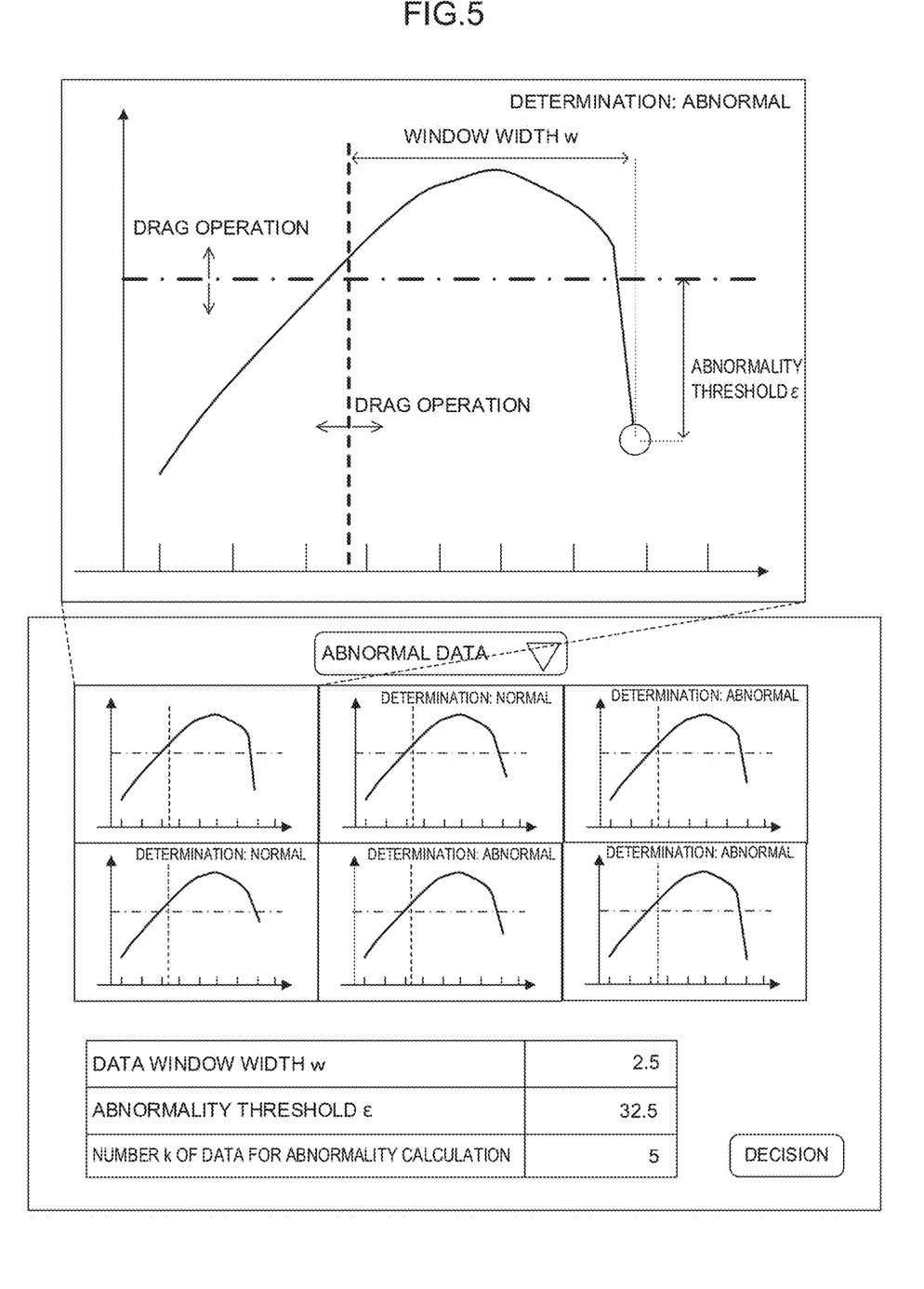
FIG. 5 is a diagram showing an example of an adjustment means provided by a parameter adjustment unit.

The parameter adjustment unit 34 adjusts the values of the parameters stored in the parameter storage unit 41, based on the user's input from the input device 71. The parameter adjustment unit 34 displays adjustment means for the individual parameters on the graph of the datasets displayed on a screen, so as to correspond to the display of the graph, as illustrated in FIG. 5, for example, and accepts the input to the adjustment means, thereby accepting the adjustment of the parameter values by the user. In this case, positions for the display of the parameter adjustment means should preferably be displayed so that the relationships between the data displayed on the graph and the parameters can be visually ascertained. In the example shown in FIG. 5, the window width w, which is a parameter of the k-nearest neighbor algorithm, is a parameter indicative of the distance range of the data to be used as determination criteria from the data point as a determination target, while the abnormality threshold $\epsilon$ is a parameter indicative of the percentage of abnormal value determination (degree of deviation of data). Therefore, if the individual parameter adjustment means are displayed in the positions shown in FIG. 5, the meanings of the parameter values and the user's visual intuition are linked with each other to facilitate the understanding.

On accepting the user's adjustment of the parameter values, the parameter adjustment unit 34 stores the adjusted parameter values into the parameter storage unit 41 and commands the determination unit 32 to perform determination (or re-determination) of the datasets stored in the dataset storage unit 40. After the determination (re-determination) processing by the determination unit 32 is completed, the parameter adjustment unit 34 commands the display unit 33 to update the display of the datasets.

With the above configuration, if a user adjusts parameters, the normality determination of the datasets by the determination unit 32 is changed based on the adjusted parameters. In a state where only datasets to which a tag indicative of abnormality is attached are displayed on a screen, for example, a user adjusts parameters so that the determination unit 32 determines all the datasets which are being displayed by performing adjustment of respective parameters to be abnormal, as a result, even a user who has little mathematical knowledge can intuitively adjust the parameters that are used for determining whether the time-series data is normal or abnormal.

While an embodiment of the present invention has been described above, the invention is not limited to the above-described embodiment and may be suitably modified and embodied in various forms.

For example, in the embodiment described above, the k-nearest neighbor algorithm is used as an example of the determination method by the determination unit 32. However, any other determination method may be used provided that the datasets are designed so that visual normality determination can be performed for the datasets graphically displayed on the screen and that the relationships between the normality determination and the parameters can be visually ascertained with ease.

Moreover, in the above-described embodiment, the time-series data (predetermined data changeable with respect to the time axis) is used as an object to be determined. However, the data based on the time axis need not be used as an object to be determined as far as the data is one in which two or more values in the data are changed in linkage with each other. For example, the invention is also applicable to sets of data indicative of the change in pressure relative to the change of a nozzle position in an injection molding machine.

The invention claimed is:

1. An abnormality detection parameter adjustment display device configured to visually support a user's adjustment of at least one parameter for determination for detecting operation abnormality of a mechanical facility based on operation information on the mechanical facility, the abnormality detection parameter adjustment display device comprising:
  a display; and
  a processor configured to:
    adjust the at least one parameter,
    collect the operation information on the mechanical facility,
    create at least one dataset based on the operation information,
    perform a normality determination to determine, based on the at least one parameter,
    whether the dataset indicates a normal operating state or an abnormal operating state, and
    create display data in which the dataset is displayed in a graph,
  wherein
  the processor is further configured to
    cause the display to display the adjustment of the at least one parameter in such a position that a relationship between the data of the graph and the at least one parameter is visually ascertainable, the adjustment being made by user's direct manipulation of the graph of the dataset, and
    in response to the adjustment of the at least one parameter made by the user's direct manipulation of the graph of the dataset, perform the normality determination and cause the display to display a result of the normality determination in the graph of the dataset,
  the processor is configured to use a k-nearest neighbor algorithm in the normality determination, and
  the at least one parameter includes data window width $\omega$, abnormality threshold $\epsilon$, or number $\kappa$ of data for abnormality calculation in the normality determination using the k-nearest neighbor algorithm.

2. The abnormality detection parameter adjustment display device according to claim 1, wherein the operation information on the mechanical facility includes:
  a coordinate position and moving speed of a drive unit of the mechanical facility, and
  acceleration, or physical quantities including at least one of current and voltage values, of a motor for driving the drive unit.

3. The abnormality detection parameter adjustment display device according to claim 1, wherein the operation information on the mechanical facility includes:
  physical quantities including at least one of temperature, humidity, pressure, coordinate position, and luminous intensity detected by a sensor attached to the mechanical facility, or
  values obtained based on the physical quantities.

4. The abnormality detection parameter adjustment display device according to claim 1, wherein the processor is further configured to create the at least one dataset within a range specified by the operation information from time-series data in the collected operation information on the mechanical facility.

5. The abnormality detection parameter adjustment display device according to claim 1, wherein
  said at least one dataset includes a plurality of datasets, and
  the processor is further configured to
    based on user's input, accept a designation of data portions in the collected operation information to be used in the normality determination, and
    store the data portions to be used in the normality determination, in association with the plurality of datasets into a storage.

6. The abnormality detection parameter adjustment display device according to claim 5, wherein the processor is further configured to
  perform the normality determination for each dataset among the plurality of datasets stored in the storage, and
  store a result of the normality determination, in association with said each dataset, into the storage.

7. The abnormality detection parameter adjustment display device according to claim 5, wherein the display is configured to display
  only datasets for which the normality determination has been performed and to which specified tags are applied, or
  all datasets for which the normality determination has been performed and after the tags applied to the datasets are enabled to be ascertained.

8. The abnormality detection parameter adjustment display device according to claim 6, wherein the processor is further configured to
  upon accepting the user's adjustment of a value of the at least one parameter,
    store the adjusted value of the at least one parameter into the storage,
    perform the normality determination, based on the adjusted value of the at least one parameter, for the plurality of datasets stored in the storage, and
    after the normality determination based on the adjusted value of the at least one parameter, command the display to update displays of the plurality of datasets.

9. The abnormality detection parameter adjustment display device according to claim 7, wherein when the display displays only those datasets for which the normality determination has been performed and to which the specified tags are applied, the processor is configured to cause the display to display the result of the normality determination in each graph of the graphs of said datasets.

10. The abnormality detection parameter adjustment display device according to claim 7, wherein when the display displays all the datasets for which the normality determination has been performed and after the tags applied to the datasets are enabled to be ascertained, the processor is configured to cause the display to display the result of the normality determination in each graph of the graphs of said datasets.

11. An abnormality detection parameter adjustment display device configured to visually support a user's adjustment of at least one parameter for determination for detecting operation abnormality of a mechanical facility based on operation information on the mechanical facility, the abnormality detection parameter adjustment display device comprising:
  a display; and
  a processor configured to:
    adjust the at least one parameter,
    collect the operation information on the mechanical facility,
    create at least one dataset based on the operation information,
    perform a normality determination to determine, based on the at least one parameter,
    whether the dataset indicates a normal operating state or an abnormal operating state, and create display data in which the dataset is displayed in a graph, wherein the processor is further configured to cause the display to display the adjustment of the at least one parameter in such a position that a relationship between the data of the graph and the at least one parameter is visually ascertainable, the adjustment being made by user's direct manipulation of the graph of the dataset, and in response to the adjustment of the at least one parameter made by the user's direct manipulation of the graph of the dataset, perform the normality determination and cause the display to display a result of the normality determination, the processor is configured to use a k-nearest neighbor algorithm in the normality determination, and the at least one parameter includes data window width $\omega$, abnormality threshold $\epsilon$, or number $\kappa$ of data for abnormality calculation in the normality determination using the k-nearest neighbor algorithm.

* * * * *